Dec. 17, 1935. W. H. HALL 2,024,640
AUTOMATIC FEEDING MECHANISM FOR VARIETY LATHES
Filed May 11, 1934 7 Sheets-Sheet 2
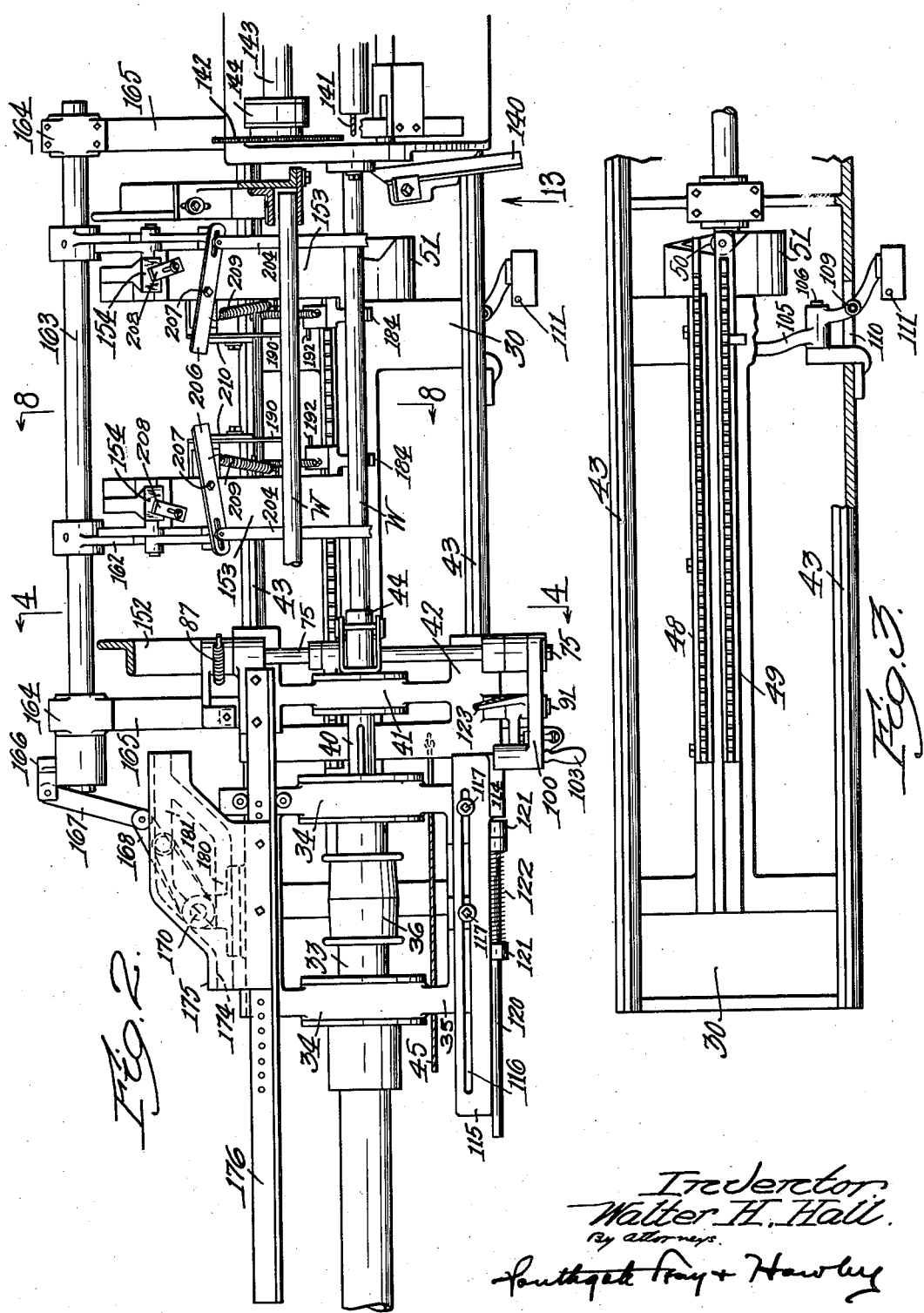

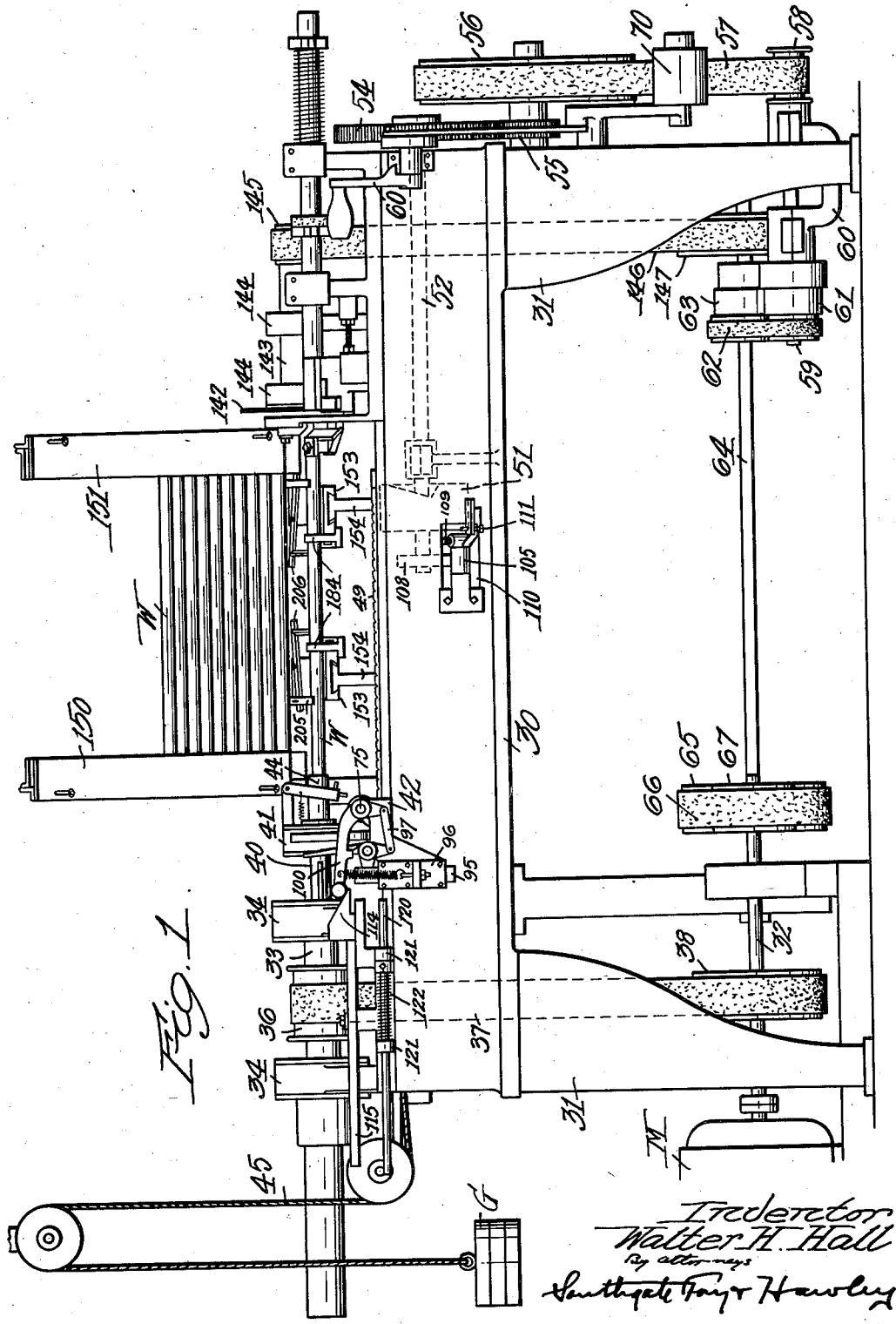

Dec. 17, 1935.   W. H. HALL   2,024,640
AUTOMATIC FEEDING MECHANISM FOR VARIETY LATHES
Filed May 11, 1934   7 Sheets-Sheet 4
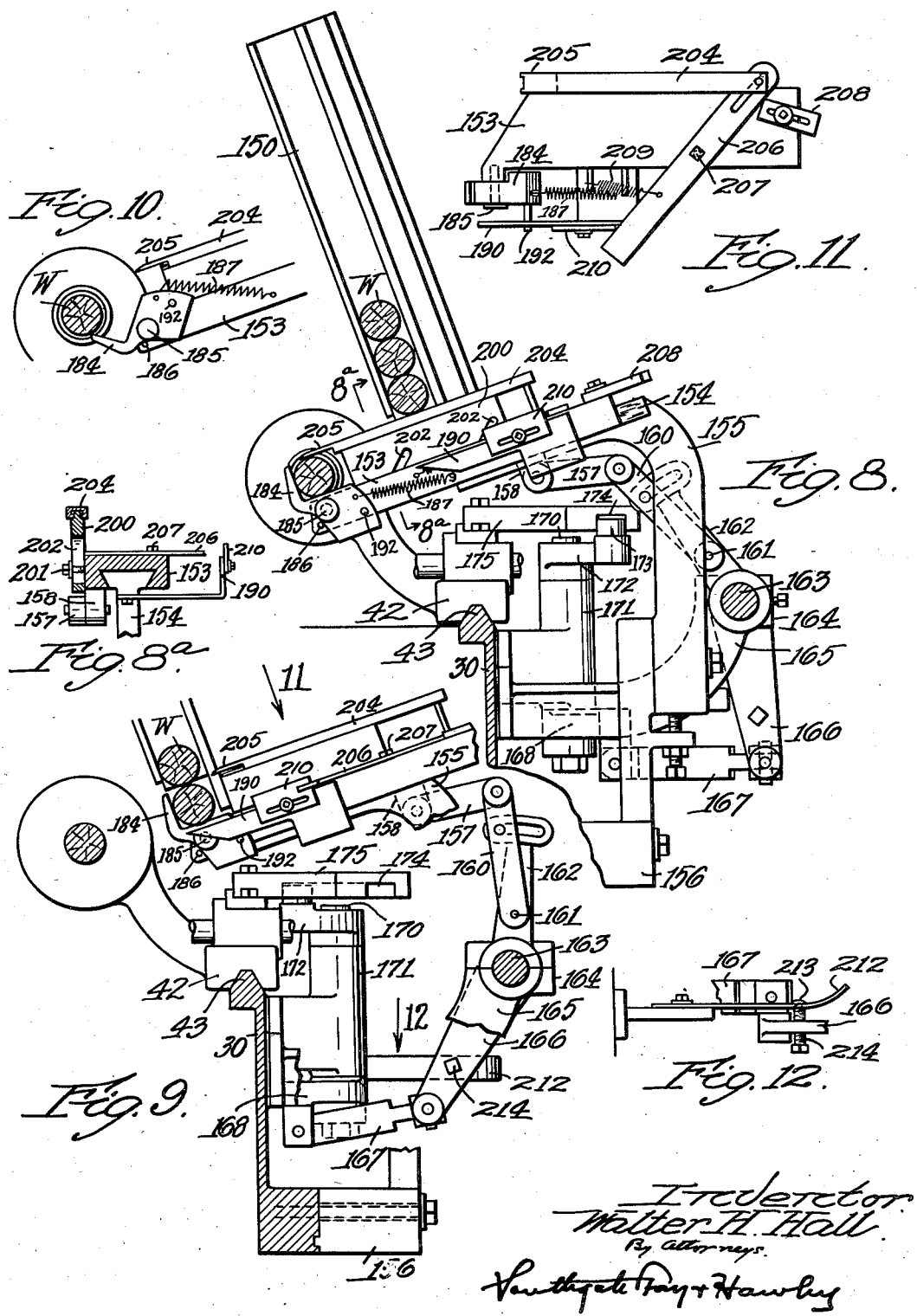

Dec. 17, 1935.   W. H. HALL   2,024,640
AUTOMATIC FEEDING MECHANISM FOR VARIETY LATHES
Filed May 11, 1934   7 Sheets-Sheet 5
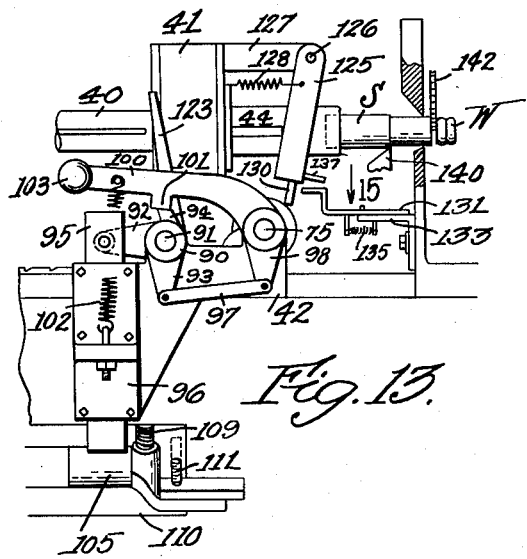
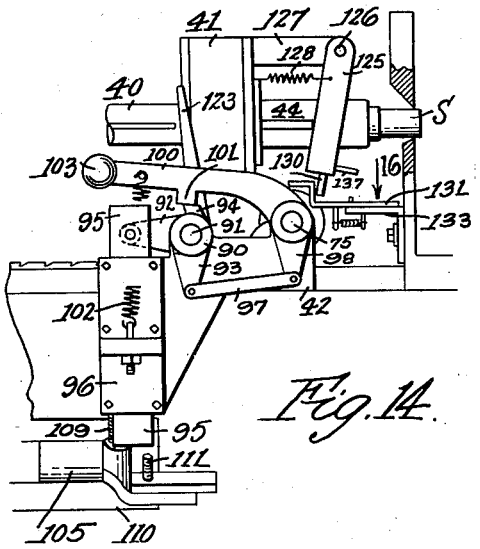
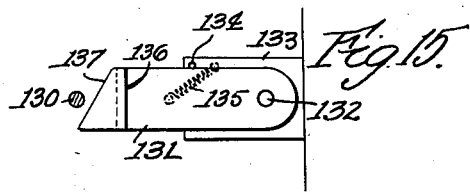
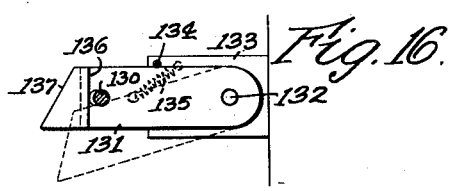
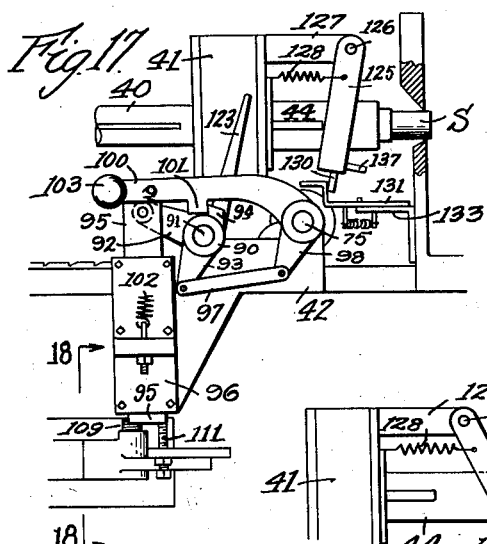
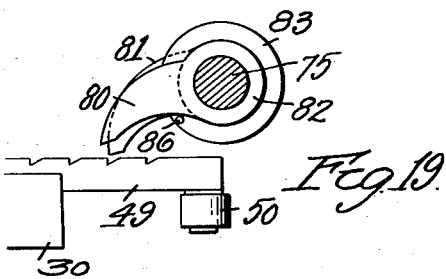
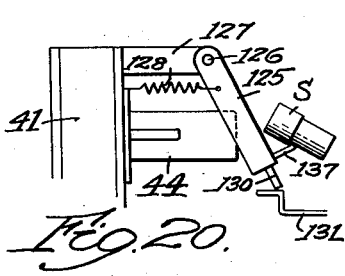
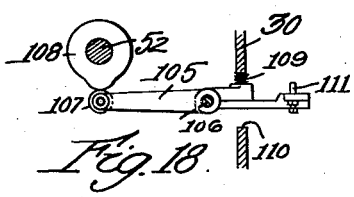
Inventor
Walter H. Hall
By attorneys
Southgate Fay & Hawley

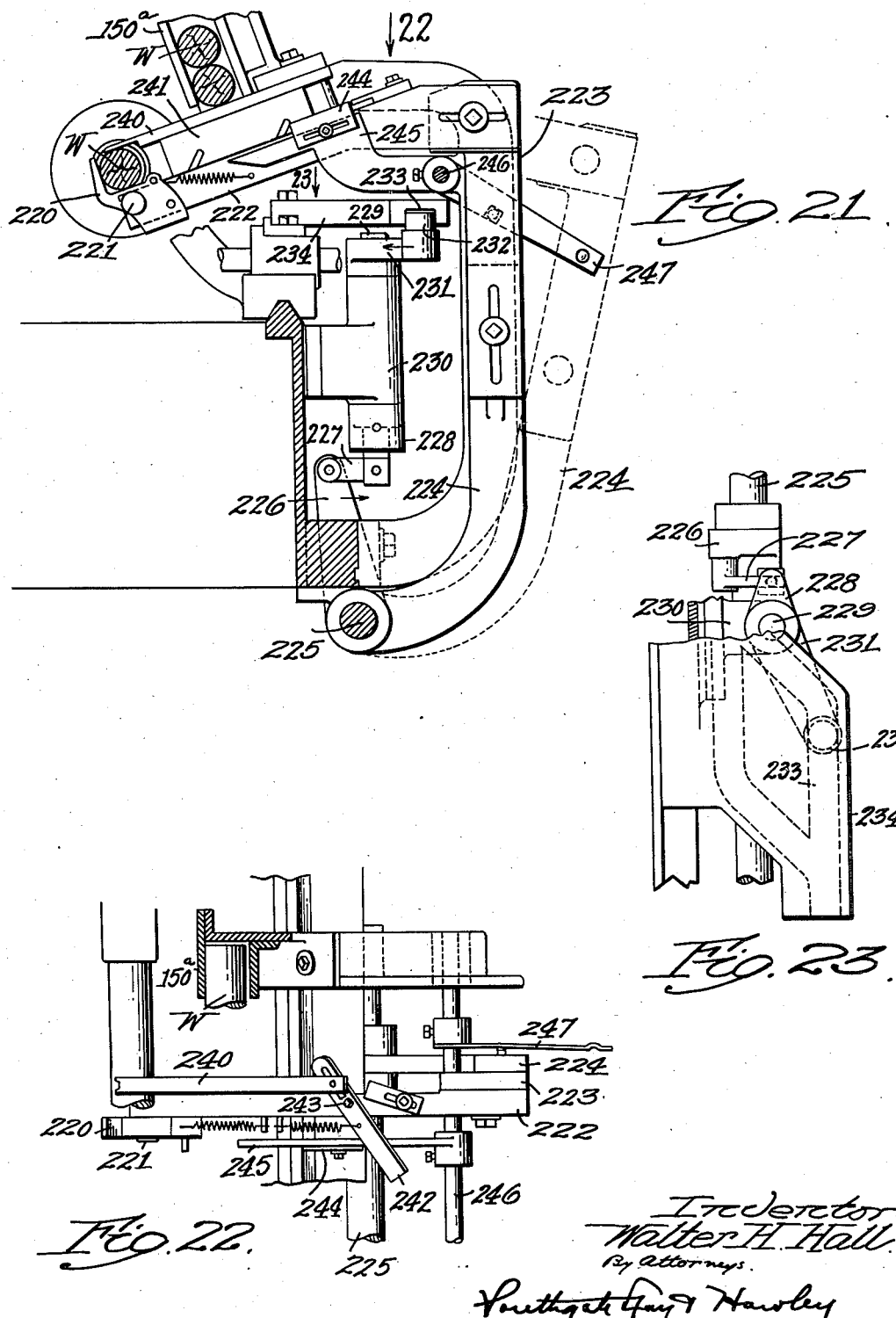

Dec. 17, 1935.   W. H. HALL   2,024,640
AUTOMATIC FEEDING MECHANISM FOR VARIETY LATHES
Filed May 11, 1934   7 Sheets-Sheet 7
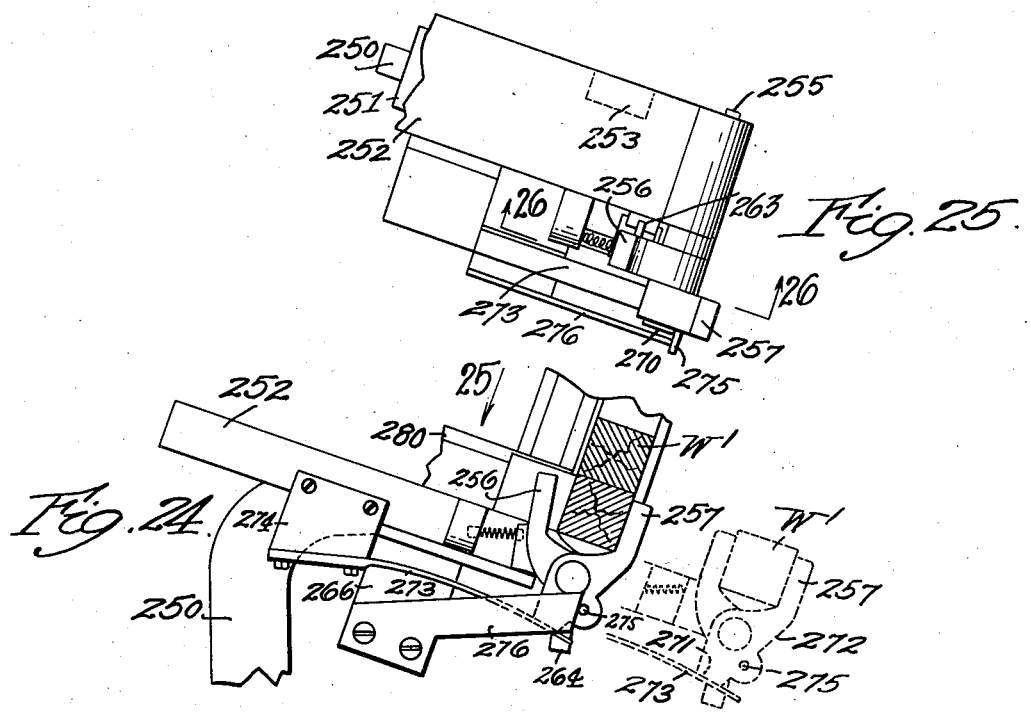
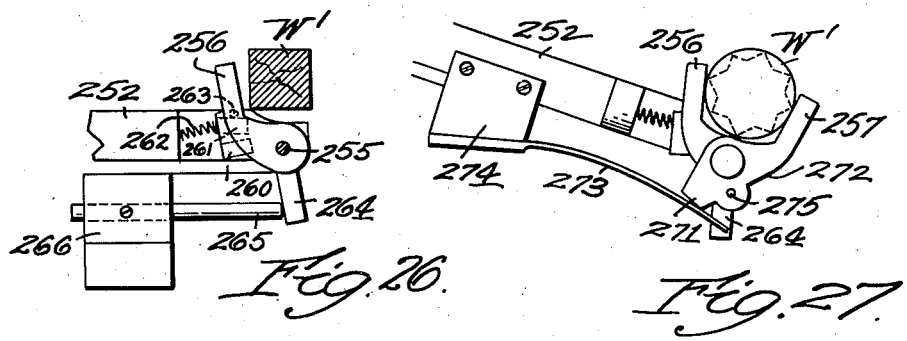
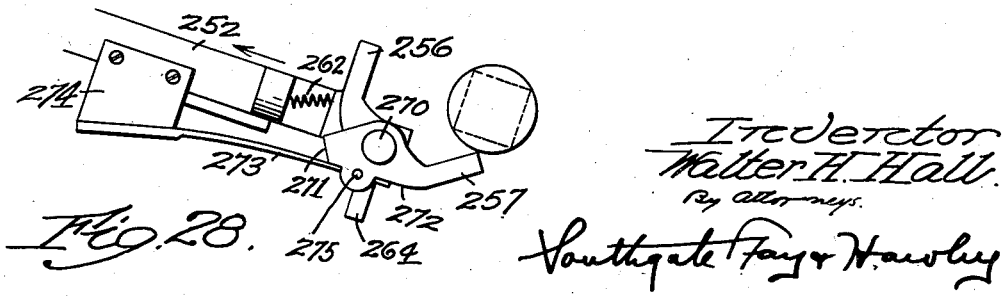

Patented Dec. 17, 1935

2,024,640

UNITED STATES PATENT OFFICE 2,024,640

AUTOMATIC FEEDING MECHANISM FOR VARIETY LATHES

Walter H. Hall, Winchendon, Mass., assignor to Goodspeed Machine Company, Winchendon, Mass., a corporation of Massachusetts Application May 11, 1934, Serial No. 725,160

7 Claims. (Cl. 142—20)

This invention relates to lathes used for turning small duplicate parts from long wooden work pieces or dowels.

It is the general object of my invention to provide improved devices for placing successive work pieces in operative position in the machine, for transforming each work piece into a plurality of small duplicate parts, and for ejecting the remaining short stub from the driving chuck or spindle preliminary to a further feeding operation.

My invention further relates to arrangements and combinations of parts which will be hereinafter described and more particularly pointed out in the appended claims.

Preferred forms of the invention are shown in the drawings, in which

Fig. 1 is a front elevation of my improved lathe;

Fig. 2 is a plan view thereof;

Fig. 3 is a plan view of a portion of the lathe bed, partly broken away;

Fig. 8 is a partial transverse sectional elevation, taken along the line 8—8 in Fig. 2;

Figure 4:
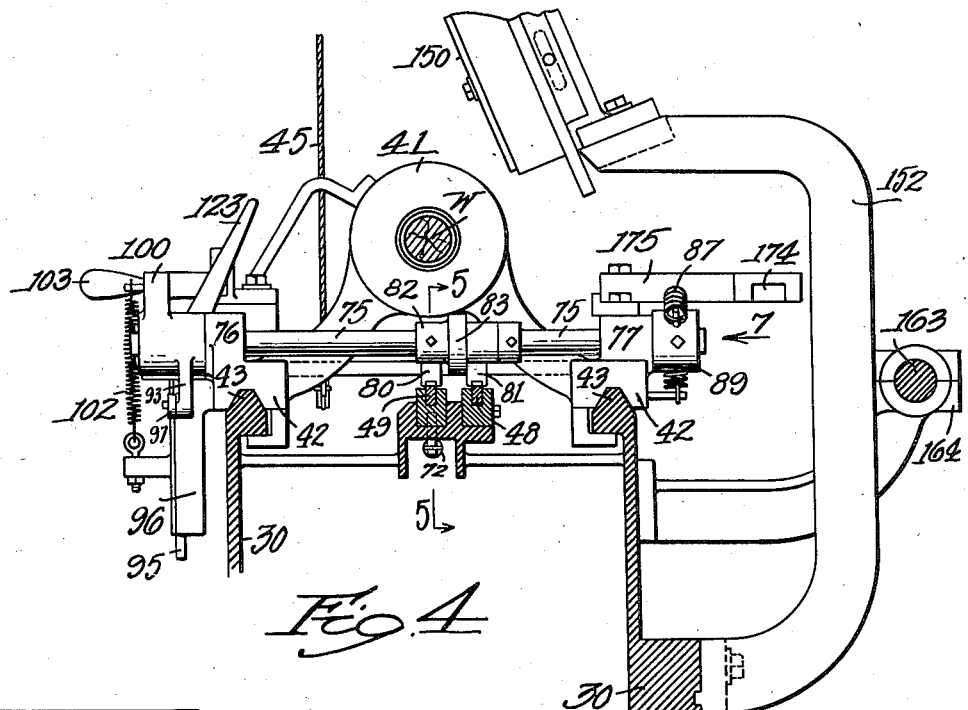
Fig. 4 is a transverse sectional elevation, taken along the line 4—4 in Fig. 2.
Figure 5:
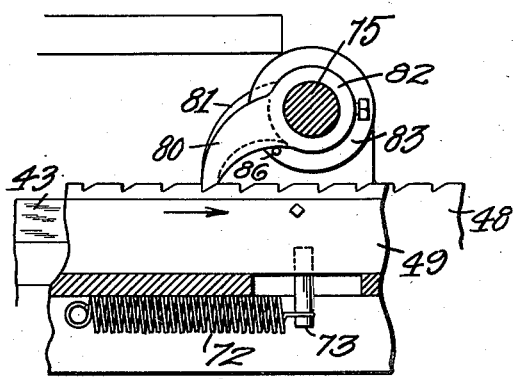
Fig. 5 is a detail longitudinal sectional elevation, taken along the line 5—5 in Fig. 4.
Figure 7:
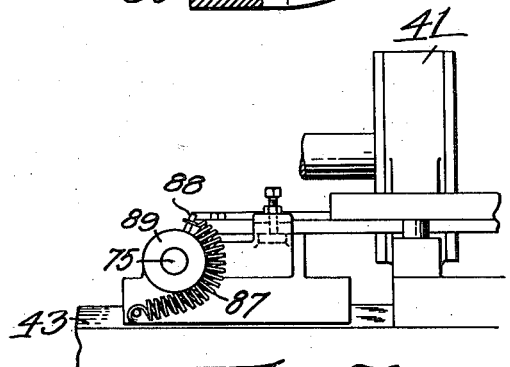
Fig. 7 is a detail rear elevation, looking in the direction of the arrow 7 in Fig. 4.
Figure 6:
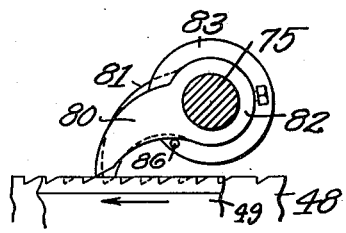
Fig. 6 is a view similar to Fig. 5 but showing the parts in a different position.

Fig. 8ª is a detail sectional view, taken along the line 8ª—8ª in Fig. 8;

Fig. 9 is a view similar to Fig. 8 but showing the parts in a different position;

Fig. 10 is a side elevation of certain parts shown in Figs. 8 and 9 but in a further different position;

Fig. 11 is a detail plan view, looking in the direction of the arrow 11 in Fig. 9;

Fig. 12 is a detail plan view, looking in the direction of the arrow 12 in Fig. 9;

Fig. 13 is a front elevation of certain parts, looking in the direction of the arrow 13 in Fig. 2 but with the driving head approaching its extreme right-hand position;

Fig. 14 is a view similar to Fig. 13, but showing the parts in a different position;

Figs. 15 and 16 are detail plan views, looking in the direction of the arrows 15 and 16 in Figs. 13 and 14 respectively;

Fig. 17 is a view similar to Figs. 13 and 14 but showing an additional relation of parts;

Fig. 18 is a detail sectional end elevation, taken along the line 18—18 in Fig. 17;

Fig. 19 is a view similar to Figs. 5 and 6 but showing the parts in an additional operative relation;

Fig. 20 is a detail front elevation of certain parts and illustrates the stub-ejecting operation;

Fig. 21 is a transverse sectional end elevation of a modified construction of feeding mechanism;

Fig. 22 is a detail plan view, looking in the direction of the arrow 22 in Fig. 21;

Fig. 23 is a detail plan view, looking in the direction of the arrow 23 in Fig. 21;

Fig. 24 is a side elevation of a further modified feeding mechanism;

Fig. 25 is a detail plan view, looking in the direction of the arrow 25 in Fig. 24;

Fig. 26 is a detail sectional elevation, taken along the line 26—26 in Fig. 25, and Figs. 27 and 28 are side elevations of certain parts shown in Fig. 24 but with the parts in additional operative relations.

Referring to the form of my invention shown in Figs. 1 to 20, I have shown a so-called "variety lathe" having a bed 30 (Fig. 1) mounted on legs 31 and having a drive shaft 32 continuously rotated by a motor M.

A work driving sleeve 33 is mounted in bearings 34 supported by a frame 35 (Fig. 2) secured in fixed position on the bed 30. The sleeve 33 is provided with a pulley 36 which is connected by a belt 37 to a driving pulley 38 on the shaft 32.

A work spindle 40 (Fig. 2) is rotatable in a bearing 41 on a work carriage 42 slidable on guideways 43 on the bed 30. The work spindle 40 is loosely slidable in the work driving sleeve 33 and is keyed thereto so that a continuous driving connection is provided in any longitudinally adjusted position of the work spindle 40 relative to the sleeve 33.

The work spindle is provided with any usual type of work driving chuck 44 (Fig. 13) in which a work piece or dowel W may be automatically centered and gripped. A counterweight G (Fig. 1) is connected by a rope 45 to the work carriage 42 and constitutes means for returning the carriage to initial loading position when released.

*Work carriage feeding mechanism*

For the purpose of intermittently feeding the work carriage 42 to the right, as viewed in Figs. 1 and 2, I provide a ratchet bar 48 (Fig. 3) fixed on the frame 30, and a ratchet or feed bar 49 slidable lengthwise in guideways on the frame 30.

The feed bar 49 has a cam roll 50 (Fig. 19) mounted beneath one end of the bar and positioned for engagement by a cam 51 (Fig. 3) mounted on a cam shaft 52 (Fig. 1) rotatable in bearings supported by the bed 30 and provided with a large gear 54 engaged by a pinion 55 mounted on a short intermediate shaft and having a large pulley 56 associated and rotatable therewith.

The pulley 56 is connected by a belt 57 to a small pulley 58 on a countershaft 59 mounted in fixed bearings 60. The shaft 59 has a cone pulley 61 connected by a belt 62 to a cone pulley 63 on a back shaft 64, also rotatable in fixed bearings and provided with a pulley 65 connected by a belt 66 to a pulley 67 on the main driving shaft 32.

An idler pulley or belt tightener 70 is provided for the belt 57 and may be manually moved to operative or inoperative position by means of a handle 69. During the normal operation of the machine, the pulley 70 maintains the belt 57 in tight driving relation on the pulleys 56 and 58.

I thus provide for relatively continuous slow rotation of the feed cam 51, by which rotation the feed bar 49 is given intermittent longitudinal feeding movements. The return movement of the feed bar 49 is effected by a spring 72 (Fig. 5) connected to a pin 73 projecting downward from the feed bar 49.

A cross shaft 75 (Fig. 4) is mounted in bearings 76 and 77 on the work carriage 42 and has a feed pawl 80 (Fig. 5) secured thereto and positioned for engagement by the feed bar 49. A holding pawl 81 is loosely mounted on the cross shaft 75 in position to engage the teeth of the stationary ratchet bar 48. The hub 82 of the feed pawl 80 has an enlarged flange 83 (Figs. 4 and 5) provided with a pin 86 extending under the holding pawl 81.

During the normal feeding operation, the pin 86 clears the holding pawl 81, so that the pawl 81 prevents return movement of the work carriage 42 after each forward feeding movement thereof.

A spring 87 (Figs. 4 and 7) is connected to a pin 88 in a collar 89 fixed to the cross shaft 75 and tends to rotate the cross shaft 75 in a direction to cause the feed pawl 80 to engage the feed bar 49.

At each movement to the right of the feed bar 49, the work carriage is advanced one or more spaces to the right, the number of spaces being in accordance with the formation of the cam 51. After each such movement, the holding pawl 81 prevents return movement of the carriage by the counterweight G while the feed bar 49 is returning to initial position.

Work carriage release

Special mechanism is provided for releasing the work carriage preparatory to its return to initial position after the carriage has completed its feeding movement to the right in Figs. 1 and 2.

Referring particularly to Figs. 13, 14 and 17, a bell crank 90 is mounted on a stud 91 supported by the work carriage 42 and is provided with arms 92 and 93 and a lug 94. The arm 92 is pivotally connected to a bar 95 vertically slidable in a bracket 96 projecting downward from the work carriage 42 outside of the frame 30.

The arm 93 is connected by a link 97 to an arm 98 fixed to the end of the shaft 75.

A latch arm 100 is loosely pivoted on the shaft 75 and has a downward projection 101 normally resting on the lug 94 previously described. The projection 101 is held firmly seated on the lug 94 by a spring 102 connected at its lower end to the bracket 96. The arm 100 is also provided with a handle 103 for manual operation.

A release lever 105 (Fig. 18) is mounted on a fixed pivot 106 and is provided with a cam roll 107 engaging a cam 108 on the cam shaft 52 previously described. A compression spring 109 causes the cam roll 107 to maintain yielding engagement with the cam 108. The lever 105 projects forward through an opening 110 in the front of the bed 30 and is provided with an adjustable contact screw 111.

During the normal operation of the machine, the release lever 105 oscillates idly, but when the feeding movement to the right is completed, the contact screw 111 engages the lower end of the bar 95 as shown in Fig. 17, rocking the bell crank 90 and operating through the link 97 and arm 98 to raise the pawls 80 and 81 to the inoperative position shown in Fig. 19. As this position is reached, the projection 101 (Fig. 17) drops in front of the lug 94 and prevents return movement of the bell crank 90 and parts controlled thereby.

The counterweight G then returns the work carriage 42 toward the left until it approaches its initial position, in which position a cam member 114 (Fig. 1) on a bar 115 engages the end of the latch arm 100 and lifts the arm to release the lug 94 as indicated in Figs. 1, 13 and 14. After such release, the feed pawls return automatically to the operative positions indicated in Figs. 5 and 6.

The bar 115 (Fig. 2) is preferably provided with an elongated slot 116 so that it may be secured by clamping screws 117 in adjusted longitudinal position, thus varying the return limit of work carriage movement.

A cushioning rod 120 (Fig. 1) is slidable in fixed bearings 121 and is provided with a spring 122 by which it is pressed yieldingly into position for engagement by the work carriage 42 as the carriage approaches initial position. The carriage is thus cushioned as it is brought to rest, and abrupt shock is avoided.

An arm 123 (Figs. 13 and 17) is connected to the bell crank 90 and projects upward therefrom for convenient manual operation of the bell crank to stop the feed at any desired point.

Ejecting device

Referring particularly to Figs. 13 to 17 and Fig. 20, I have provided a device for ejecting the short stub S of the work piece W after the last turning operation thereon.

For this purpose I provide a yoke 125 (Fig. 13) pivoted at 126 on an arm 127 projecting forward from the top of the work spindle bearing 41 on the work carriage 42. A spring 128 holds the yoke 125 normally in the position shown in Figs. 13 and 14.

A stud 130 projects downward from the end of the yoke 125 into position to engage a latch 131 (Fig. 15) pivoted at 132 on a fixed bracket 133. The latch 131 is normally held yieldingly against a stop pin 134 by a spring 135. The outer end of the latch 131 is offset upwardly, as shown in Figs. 13 and 14, and is provided with a shoulder 136 and a beveled end face 137.

As the work carriage 42 moves to the right, the stud 130 engages the cam face 137 and swings the latch 131 to the dotted line position in Fig. 16. As soon as the stud 130 passes the shoulder 136, the latch returns to the position shown in full lines in Fig. 16, with the stud 130 at the right of the shoulder 136.

As the carriage 42 is thereafter released and moves to the left, as viewed in the drawings, the yoke 125 is moved to the position shown in Fig. 20 and a projection 137 thereon engages the short stub S and ejects it from the driving chuck 44 on the end of the work spindle 40. The chuck is thus cleared as return movement of the work carriage 42 commences, so that there is no interference with the new work piece W when inserted.

The lathe may be equipped with any desired turning tool 140 (Fig. 2) and also with a center boring drill 141 and cutting-off saw 142. The saw 142 may be mounted on a spindle 143 rotatable in swinging bearings 144 and may be connected by a pulley 145 (Fig. 1), belt 146 and pulley 147 to the back shaft 54 previously described. These turning, boring and cutting-off tools are of the usual type and form no part of my present invention.

Stock feeding mechanism

The mechanism for feeding stock to the lathe is best shown in Figs. 1, 2 and 8 to 12 inclusive. Referring to these figures, I have provided a hopper comprising upwardly extending end members 150 and 151 (Fig. 1) spaced apart to provide guideways for the ends of the pieces of work W which are held in storage in the hopper.

These members 150 and 151 are mounted on brackets 152 (Fig. 4) secured to the lathe bed 30 and longitudinally adjustable thereon in accordance with the length of the work.

Carriers 153 (Fig. 8ª) are slidable on guiding supports 154 extending forwardly and downwardly from brackets 155 (Fig. 8) mounted for vertical adjustment on stands 156 secured to the bed 30 and longitudinally adjustable thereon.

A link 157 (Fig. 8) for each carrier 153 is connected at one end to a lug 158 (Figs. 8 and 8ª) depending from the carrier and at the other end to a bar 160 pivoted at 161 to an arm 162 fixed to a rock shaft 163. The bar 160 has a bolt and segmental slot connection to the arm 162, so that it may be conveniently adjusted angularly relative thereto.

The rock shaft 163 (Fig. 2) is mounted in fixed bearings 164 on brackets 165 (Fig. 8) extending rearward from the bed 30. An arm 166 has a swivel connection to a link 167 (Fig. 2) and the other end of the link has a similar swivel connection to an arm 168 (Fig. 9) fixed to the lower end of a vertically disposed rock shaft 170.

The shaft 170 is mounted in a fixed bearing 171 and is provided at its upper end with an arm 172 (Fig. 8) having a cam follower or stud 173 which cooperates with a cam groove 174 (Figs. 2 and 8) in a cam plate 175 which may be secured in longitudinally adjusted position on a bar 176 extending to the left from the work carriage 41 as viewed in Fig. 2.

As the work carriage 42 is reciprocated, the cam follower 173 will follow the front branch 180 of the cam groove 174 as the work carriage 42 is moved to the left to initial position, and will follow the rear branch 181 of the cam groove 174 as the work carriage is intermittently fed to the right during the operation of the lathe.

The rock shaft 163 is thus given an anticlockwise movement from the position shown in Fig. 9 to the position shown in Fig. 8 as the return movement of the work carriage is completed, and is given a clockwise movement soon after the intermittent feeding of the work carriage to the right begins.

In this manner the carriers 153 (Fig. 8) are advanced toward the axis of the work spindle 40 at each return of the work carriage 42 to initial position and are thereafter withdrawn to normal inoperative position as shown in Fig. 9.

A work-holding latch 184 (Figs. 8, 10, and 11) is pivoted at 185 to the front end of each carrier 153 and is normally maintained against a stop 186 by a spring 187. In this position latches 184 retain the lowermost work piece W on the carriers 153, as indicated in Fig. 9.

The latches remain in this position as the carrier is advanced to move the work piece to the position indicated in Fig. 8, but yield as indicated in Fig. 10 to clear the work as the carriers are withdrawn.

A cam bar 190 (Figs. 8ª and 9) forms part of an offset projection 191 of each guideway 154, and the beveled front end of each bar 190 engages a stud 192 on the side of the associated latch 184 and positively returns the latch to holding position as the carriers are withdrawn to the position shown in Fig. 9, thus preventing the possibility of the latches remaining in the inoperative position indicated in Fig. 10.

A plate 200 (Figs. 8 and 8ª) is secured to the side of each carrier 153 by binding screws 201 extending through inclined slots 202. A separating and retaining member 204 is slidable in guideways on the top of each plate 200 and has a reduced and pointed end portion 205 adapted to be inserted between the two lowermost pieces of work W in the hopper at the beginning of a feeding movement.

Each member 204 has a pin and slot connection with a lever 206 (Fig. 11) pivoted at 207 to one of the carriers 153 and normally held yieldingly against an adjustable stop 208 by a tension spring 209. An abutment plate 210 is adjustably secured to the side of each fixed cam bar 190 in position for engagement by the associated lever 206 as the carrier 153 moves forward. Such movement advances the member 204 more rapidly than the carrier 153 and thus inserts the end portion 205 of the member 204 under the second work piece W in the hopper before the lowermost work piece is removed.

Each member 204 continues its advance movement relative to the carrier 153 until the parts reach the position indicated in Fig. 8, in which position the work W is aligned with the work spindle 40 and chuck 44. This movement is effected by travel of the cam follower 173 (Fig. 2) along the front portion 180 of the cam groove 174 and along the inclined right-hand end portion of the cam groove (as viewed in Fig. 2) until the cam follower 173 enters the rear straight portion 181 of the cam groove.

The work piece is then held loosely in alignment with the work spindle 40 while the intermittent work feeding movement commences. The axial spacing of the latches 184 and members 204 (Fig. 2) from the initial left-hand position of the chuck 44 permits the work-holding devices to remain in work-presenting position until the cam follower 173 enters the inclined left-hand end portion of the cam groove 174, thereby withdrawing the feeding devices to the position shown in Fig. 9.

As the work feed continues, the cam roll 173 leaves the cam groove 174 and in order to prevent displacement of the feeding mechanism during such further operation of the machine, I provide a flat spring 212 (Figs. 9 and 12) mounted in fixed position and having a cupped portion 213 to receive the rounded point of a screw 214 threaded in the arm 166. When the parts are moved to the position shown in Fig. 9, the end of the screw 214 enters the cup 213 and yieldingly prevents displacement of the parts.

Having described the details of construction of one form of my invention, the method of operation thereof will be readily apparent. Assuming that the parts are in the position shown in Fig. 8, with the work carriage 42 in its extreme left-hand position, the continuous operation of the cam 51 will intermittently advance the work carriage to the right, causing the chuck 44 to engage the piece of stock W. After a brief interval the cam plate 175 will act through the described connections to withdraw the feeding mechanism to the position shown in Fig. 9. During such withdrawal, the latches 184 will yieldingly pass under the work W as indicated in Fig. 10.

As the carriage continues to feed to the right, the cam follower 173 leaves the straight portion 180 of the cam groove 174 but is retained in inoperative position by the spring 212 (Fig. 12) as previously described.

Upon completion of the desired number of operations on the work, the contact screw 111 (Figs. 17 and 18) engages the slide bar 95 and releases the pawls 80 and 81, latching the parts in the inoperative position shown in Figs. 17 and 19 during the return movement of the work carriage 42. During such return movement, the short remaining stub S of the work piece is removed from the chuck by the yoke 125, as indicated in Fig. 20.

As the work carriage approaches its left-hand limit of movement, the cam follower 173 again enters the cam slot 174 and operates to advance a fresh work piece W into alignment with the chuck 44. Automatic operation of the machine thus continues so long as the hopper is kept supplied with work pieces.

All parts of the device are made readily adjustable, so that the hopper may receive work pieces of any desired length and so that the latches 184 and members 204 may be spaced properly in relation to the length of the work pieces. The parts may also be adjusted as desired to accommodate work pieces of different diameters.

*Simplified feeding mechanism*

In Figs. 21 to 23 I have shown a modified construction in which the feeding mechanism is somewhat simplified and in which the parts may be positioned more closely adjacent axially for shorter work pieces. In these figures I have shown the work pieces W positioned in guideways in a hopper 159ª as in the previous form. Each latch 220 is, however, pivoted at 221 on a supporting arm 222 having a bolt and slot connection with the upper end of a member 223, which in turn has a bolt and slot connection with an arm 224 fixed to a rock shaft 225 (Fig. 22).

The shaft 225 has an arm 226 (Fig. 21) connected by a link 227 to an arm 228 secured to an upright shaft 229 mounted in a fixed vertical bearing 230 and having an arm 231 (Fig. 23) provided with a cam follower 232 positioned to enter a cam slot 233 in a cam plate 234 corresponding to the cam plate 175 previously described.

As the cam follower 232 traverses the cam groove 233, the supports 222 are moved forward and rearward, as in the case of the carriers 153 previously described.

A separator bar 240 (Fig. 22) is slidable on a plate 241 secured to each support 222. Each bar 240 has a pin and slot connection to a lever 242 pivoted at 243 on its support 222 and is engaged by an abutment plate 244 on a cam bar 245, as in the previous construction.

Each cam bar 245 is mounted on a fixed cross rod 246, which cross rod also supports a flat spring 247 corresponding in function to the spring 212 previously described and operative to hold the parts in the inoperative dotted line position indicated in Fig. 21 during operations on the work piece.

The operation of this form of my invention is substantially the same as that previously described, but the connections are rather more direct and the axial space required between the parts is somewhat reduced.

*Feeding mechanism for square stock*

In Figs. 25 to 28 I have shown a modified construction particularly adapted for use with stock of square cross section. In this construction, brackets 250 are mounted on the bed 30 and each bracket is provided with an inclined dove-tailed guiding portion 251 on which a carrier 252 is slidable.

Each carrier 252 has a depending lug 253 (Fig. 25) corresponding to the lug 158 (Fig. 8) on the carrier 153 previously described and the carriers 252 are adapted to be operated by the actuating mechanism provided for the carriers 153 and shown in detail in Figs. 2 and 8.

A stud 255 is fixed in the forward end of the carrier 252 and supports a pair of work-engaging members 256 and 257.

The member 256 (Fig. 26) has a laterally projecting lug 260 normally engaging a lug 261 on the adjacent side of the carrier 252. A spring 262 acts to swing the member 256 in a clockwise direction to cause the lugs 260 and 261 to engage. A stop pin 263 limits anti-clockwise movement of the member 256 by engaging the top of the lug 261.

The member 256 also has a depending arm 264 positioned for engagement by the end of a stop rod 265 adjustably secured in a block 266 fixed to the guiding portion 251 of the bracket 250. As the carrier 252 reaches its normal withdrawn or inoperative position, the rod 265 engages the arm 264 and swings the member 256 slightly rearward, as indicated in Figs. 24 and 26, to facilitate insertion of a fresh piece of work W'.

The member 257 is retained in position by the head 270 of the stud 255. The member 257 has angularly disposed surfaces 271 and 272, either of which may be yieldingly engaged by a flat spring 273 mounted on a bracket 274 secured to the carrier 252 and movable therewith.

The member 257 also has a pin 275 projecting laterally into position for engagement by an abutment 276 secured to the end of the block 266 previously described. When the carrier 252 returns to normal inoperative position, the pin 275 engages the abutment 276 and the member 257 is moved to the position shown in Fig. 24, with the spring 273 engaging the flat surface 271.

As the carriers are moved to initial or withdrawn position, separator bars 280 (corresponding in all respects to the separator bars 204 previously described), are withdrawn, permitting a fresh piece of work W' to drop between the members 256 and 257 on the carriers 252, as indicated in Fig. 24.

The carriers are then advanced, moving the parts to the dotted line position in Fig. 24, in which position the work is aligned with the work spindle by which it is thereafter centered and rotated.

During initial rotation of the work piece, the members 256 and 257 yield slightly as indicated in Fig. 27 until the carriers are withdrawn. During such withdrawal, the members 257 swing to the position shown in Fig. 28, with the flat springs 273 engaging the flat surfaces 272. As the return movement is completed, the pins 275 engage the stops 276 and thereby restore the members 257 to initial position.

This form of my invention is thus well adapted for use with stock of non-circular cross section.

Having thus described my invention and certain modifications thereof, I do not wish to be limited to the details herein disclosed, otherwise than as set forth in the claims, but what I claim is:—

1. In a variety lathe having a bed, in combination, a work carriage, a work hopper mounted in fixed position on said bed, spaced carriers operative to advance selected work pieces to working position, a cam plate movable with said carriage and having a double-branched cam groove therein, an arm having an operative connection to said carriers and having a cam follower positioned to enter one branch of said cam groove and to be moved thereby in one direction as said carriage returns to initial position and positioned to enter the second branch of said cam groove and to be moved thereby in the opposite direction as said carriage is fed from initial position.

2. The combination in a variety lathe as set forth in claim 1, in which said cam follower leaves said cam groove during continued feeding of said carriage from initial position and re-enters said cam groove as said carriage returns and approaches initial position, and in which means is provided to yieldingly prevent movement of said arm and cam follower when said cam follower is out of said cam groove.

3. In a variety lathe having a bed, in combination, a work carriage, a work hopper mounted in fixed position on said bed, spaced carriers operative to advance selected work pieces to working position, each carrier having a separator bar slidably mounted thereon, and means to advance each separator bar more rapidly than its carrier to a position in which it constitutes an upper retaining member for the selected work piece when said work piece is advanced to working position.

4. In a variety lathe having a bed, in combination, a work carriage, a work hopper mounted in fixed position on said bed, spaced carriers operative to advance selected work pieces to working position, each carrier having a separator bar slidably mounted thereon, a lever for each separator bar pivoted on the associated carrier, and a fixed abutment for each lever which is engaged thereby at the opposite side of the axis of said lever from said separator bar as the carriers are advanced, whereby said separator bars are advanced more rapidly than said carriers to positions in which they form upper retaining members for the selected work piece.

5. In a variety lathe having a bed, in combination, a work carriage, a work hopper mounted in fixed position on said bed, spaced carriers operative to advance selected work pieces to working position, means to advance and withdraw said carriers in predetermined relation to the movements of said work carriage, a pair of work-holding members pivotally mounted on each carrier, one of each pair of said members being yieldingly movable to an inoperative position to clear the work as withdrawal of said carriers begins, means to hold said members yieldingly in inoperative position, and means to restore said members to operative position as withdrawal of said carriers is completed.

6. In a variety lathe having a bed, in combination, a work carriage, a work hopper mounted in fixed position on said bed, spaced carriers operative to advance selected work pieces to working position, a cam plate fixed to and movable with said carriage and having a substantially diamond-shaped cam groove therein, an arm having a cam follower positioned to enter said cam groove and to be moved positively in both directions thereby, and connections from said arm to said carriers, said connections including a horizontal rock shaft positioned at the back of the lathe, a pair of two-part lever arms mounted on said rock shaft and link-connected to said carriers, and means to secure the two parts of each lever arm in angularly adjusted relation.

7. In a variety lathe having a bed, in combination, a work carriage, a work hopper mounted in fixed position on said bed, spaced carriers operative to advance selected work pieces to working position, supports on which said carriers are slidably mounted, a rock shaft to which said supports are secured, and cam means and connections to rock said shaft and supports in one direction as said work carriage returns to initial position and in the opposite direction as said work carriage is moved to feed the work axially, said cam means and connections including a vertically-disposed cam-oscillating shaft, arms on said vertical shaft and said rock shaft, and a direct link connection between said arms.

WALTER H. HALL.